United States Patent
Fujii

(10) Patent No.: US 6,461,472 B2
(45) Date of Patent: Oct. 8, 2002

(54) EXPLOSIVELY-SPLIT FRAGMENTS OBTAINED BY WATER-VAPOR EXPLOSION OF WOODEN SOURCE MATERIALS, WOODEN MATERIAL CONTAINING SUCH FRAGMENTS AS ITS AGGREGATE, THEIR MANUFACTURING METHODS AND MACHINES

(75) Inventor: Tsuyoshi Fujii, Ibaragi-ken (JP)

(73) Assignee: The Forestry and Forest Products Research Institute, Ibaragi-Ken (JP)

( * ) Notice: Subject to any disclaimer, the term of this patent is extended or adjusted under 35 U.S.C. 154(b) by 0 days.

(21) Appl. No.: 09/962,775

(22) Filed: Sep. 24, 2001

(65) Prior Publication Data

US 2002/0011307 A1 Jan. 31, 2002

Related U.S. Application Data

(62) Division of application No. 09/385,668, filed on Aug. 27, 1999, now abandoned.

(30) Foreign Application Priority Data

Mar. 3, 1999 (JP) .............................................. 11-54979

(51) Int. Cl.⁷ ................................................. D21B 1/36
(52) U.S. Cl. .................................. 162/21; 241/1; 241/2
(58) Field of Search ............................. 162/21, 22, 247; 241/1, 12, 2

(56) References Cited

U.S. PATENT DOCUMENTS

| | | |
|---|---|---|
| 1,586,159 A | 5/1926 | Mason |
| 3,707,436 A | 12/1972 | O'Connor |
| 4,000,032 A | 12/1976 | Bergstrom et al. |
| 4,163,687 A | 8/1979 | Mamers et al. |
| 4,461,648 A | 7/1984 | Foody |
| 5,135,612 A | 8/1992 | Desrochers et al. |

FOREIGN PATENT DOCUMENTS

| | | | | |
|---|---|---|---|---|
| CA | 553951 | * | 3/1958 | .................. 162/21 |
| EP | 0153182 A2 | * | 8/1985 | .................. 162/21 |

OTHER PUBLICATIONS

English language Abstract and Figure of Japanese Patent "Manufacture of Split Wood and Manufacturing Device", Publication No. 10–175203, Jun. 30, 1998, Japanese Application No. 08–341327 (JP 96341327), Filed Dec. 20, 1996.
English language Abstract and Figure of Japanese Patent "Lengthy Bamboo Skin Flat Plate and Its Composite Plate", Publication No. 10–156805, Jun. 16, 1998, Japanese Application No. 08–319533 (JP 96319533), Filed Nov. 29, 1996.
English language Abstract and Figure of Japanese Patent "Production of Cleavage Material and Apparatus Therefor", Publication No. 10–100111, Apr. 21, 1998, Japanese Application No. 08–256769 (JP 96256769), Filed Sep. 27, 1996.

* cited by examiner

Primary Examiner—Sam Chuan Yao
(74) Attorney, Agent, or Firm—Barry R. Lipsitz; Douglas M. McAllister

(57) ABSTRACT

In order to inexpensive construction materials effectively utilizing timber resources and realizing any desired properties by using so-called low-quality materials including slim timbers, old timbers, wood cuttings produced by lumbering, bamboo, and so forth, wood, bamboo and other wooden source materials are split into fragments along their fibers by water vapor explosion, and such explosive-split fragments are shaped and hardened by adding an adhesive, mortar or expandable resin into a new wooden material such as multi-layered board, cement board or foamed resin board of explosive-split fragments. The explosive-split fragments are also usable in various fields other than fabrication of the new material.

10 Claims, 7 Drawing Sheets

FIG. 6

| moisture | temperature (°C) | pressure (MPa) | heat/press time (second) | shape ** | shape and size of explosive-split strand coupling | thickness (mm) | length (mm) |
|---|---|---|---|---|---|---|---|
| water-saturated | 200 | 2 | — | minute cord | — | — | — |
| water-saturated | 200 | 4 | 270 | minute cord | cord-fabric | 3 | 450 |
| water-saturated | 200 | 6 | 210 | minute cord | semi-separated | 5 | 600 |
| water-saturated | 250 | 2 | 150 | minute cord | net | 5 | 450 |
| water-saturated | 250 | 4 | 90 | minute cord | semi-separated | 3 | 300 |
| water-saturated | 250 | 6 | 80 | minute cord | semi-separated | 3 | 300 |
| water-saturated | 300 | 2 | 90 | minute cord | semi-separated | 5 | 450 |
| water-saturated | 300 | 4 | 75 | minute cord | semi-separated | 3 | 150 |
| water-saturated | 300 | 6 | 50 | minute cord | semi-separated | 2 | 300 |

\* restricted in width direction of lumber   \*\* plate: straight, rod: slightly curved, cord: largely curved

FIG. 7

| moisture | temperature (°C) | pressure (Mpa) | heat/press time (second) | shape and size of explosive-split strand ** | | | |
|---|---|---|---|---|---|---|---|
| | | | | shape | coupling | thickness (mm) | length (mm) |
| dried material | 200 | 3 | 360 | split plate | cord-fabric | 20 | 600 |
| | 200 | 6 | 240 | thick rod | cord-fabric | 10 | 600 |
| | 250 | 3 | 300 | split plate | cord-fabric | 15 | 600 |
| | 250 | 6 | 180 | thin rod | cord-fabric | 5 | 600 |
| raw material | 200 | 3 | 240 | thick rod | cord-fabric | 10 | 600 |
| | 200 | 6 | 180 | minute cord | cord-fabric | 5 | 300 |
| | 250 | 3 | 210 | thin rod | cord-fabric | 5 | 450 |
| | 250 | 6 | 120 | minute cord | net | 2 | 150 |
| | 250 | *6 | 90 | thin fragment | separated | 2 | 30 |
| water-saturated | 200 | 3 | 180 | thick rod | cord-fabric | 10 | 600 |
| | 200 | 6 | 120 | minute cord | net | 5 | 450 |
| | 250 | 6 | 90 | minute cord | net | 3 | 200 |
| | 250 | *6 | 60 | minute cord | semi-separated | 3 | 100 |

\* restricted in width direction of lumber   \*\* plate: straight,  rod: slightly curved,  cord: largely curved

EXPLOSIVELY-SPLIT FRAGMENTS OBTAINED BY WATER-VAPOR EXPLOSION OF WOODEN SOURCE MATERIALS, WOODEN MATERIAL CONTAINING SUCH FRAGMENTS AS ITS AGGREGATE, THEIR MANUFACTURING METHODS AND MACHINES

This application is a divisional of U.S. patent application Ser. No. 09/385,668 filed Aug. 27, 1999 now abandoned.

BACKGROUND OF THE INVENTION

This invention generally relates to a technology for effective use of wooden source materials, and more particularly to a technology for decomposing into fragments various things, such as excessively slim trees and branches normally left as residues in forests, flitches and wood cuttings produced in factories, construction and demolition wastes as one of industrial wastes, and so forth, by water-vapor explosion, and a technology for binding these fragments by any appropriate adhesive and shaping them into a new wooden material.

Wood has been used widely since old days because of a number of advantages it has, such as giving soft and warm impressions, being easy to obtain and work, and being reproducible. Moreover, along with the global increase of population and improvements of human lives, the amount of use of wood has increased remarkably, and the demand for wooden materials is getting higher and higher, and more and more diversified.

Under these circumstances, there have been developed new wooden materials like OSB (orientated strand boards), WB (wafer boards), PSL (parallel strand laminates) in addition to conventional lumbers, bonded wood, plywood laminates, LVL (veneer laminates), shavings boards, fiberboards, wood wool cement boards and wood piece cement boards.

However, only with developments of these conventional wooden materials, limited forest resources cannot be used effectively.

For example, conventional lumbers and bonded wood use only a half of the entire volume of trees, and a lot of flitches and wood cuttings have been left useless.

In case of plywood laminates, LVL and PSL, 50 to 70% in volume of logs can be used, but the logs are limited to those with large diameters.

As to shavings boards, fiberboards, OSB and WB, logs of relatively small diameters can be used as well, and a high yield is promised. However, those with very small diameters, such as forest residues, and those containing metal pieces, earth, sand or other foreign matters, such as construction wastes, still remain unused. In case of wood wool cement boards and wood piece cement boards, their strength performances are not large enough to be used as structural members.

Toward an effective use of residues and wastes, there have been developed techniques for crushing them into chips, digesting and splitting them into the form of pulp, and manufacturing paper and boards therefrom.

As one of these techniques, there has been proposed a method of making fibrous elements by first blowing high-temperature, high-pressurized steam onto chips in a pressure tube and then momentarily releasing the pressure, in the process of the digestion (explosive crushing method). However, it needs the process of once chipping residues and wastes, and has not yet overcome technical problems difficult to control, such as injection of high-temperature, high-pressurized steam.

As explained above, although various efforts have been made toward effective use of wood resources, to date, the purpose has not been achieved sufficiently.

For example, almost all of very thin trees and branches are left unused in forests.

Further, although flitches, wood cuttings and other fragments produced in the wood industry are being crushed into chips for use as source material of paper and boards, or sent to wood-waste boilers as a fuel, these ways of use are not sufficiently effective from the economical viewpoint. Regarding construction wastes and other industrial wastes, although a part thereof is crushed into chips, major part thereof is still being discarded or incinerated because it is difficult to collect them or re-use them due to the presence of metal pieces, earth, sand or other foreign matters therein.

Taking account of the today's tendency toward a decrease of the forest resources along with developments and aggravation of the environments for the worse thereby, it is an urgent issue from the technical and economical viewpoints to find out how to deal with and use these thin trees, branches, cutting wastage from factories, industrial waste, and so on, heretofore not used effectively by any existing means.

SUMMARY OF THE INVENTION

It is therefore an object of the invention to provide fragments obtained by water-vapor explosion of wooden raw materials, wooden material containing such fragments as its aggregate, their manufacturing methods and machines, which ensure the effective use of lumber resources.

According to the invention, there is provided a technique for reforming wood, bamboo and other wooden materials into fragments having desired properties and various sizes and shapes so as to enable fabrication of wooden material fragments usable various purposes even from slim trees, branches, wood cuttings from factories, construction wastes, and so on, to thereby overcome the problems involved in conventional techniques, comprising the steps of:

(a) adjusting water content of wooden source materials including wood and bamboo;

(b) compressing the source materials under a high temperature; and (c) after compressing the source materials for a predetermined duration of time, instantaneously releasing the pressure to invite water vapor explosion in the wooden materials and partly or entirely releasing fiber coupling in the wooden materials along fibers thereof.

In the step (b), a plurality of source materials may be stacked to align their fibers substantially in parallel and may be compressed under a high temperature.

According to the invention, there is further provided a technique comprising the steps of:

(a) adjusting water content of wooden source materials including wood and bamboo;

(b) compressing the source materials under a high temperature; and (c) after compressing the source materials for a predetermined duration of time, instantaneously releasing the pressure to invite water vapor explosion in the wooden materials and partly or entirely releasing fiber coupling in said wooden materials along fibers thereof, thereby to obtain the explosive-split fragments;

(d) drying the explosive-split fragments;
(e) applying an adhesive onto the dried explosive-split fragments;
(f) stacking the explosive-split fragment obtained in the step (e); and
(g) compressing the stacked explosive-split fragments under a heat to obtain a multi-layered material of explosive-split fragments of a predetermined size and shape, to thereby realize new and useful wooden materials to overcome the problems involved in the conventional techniques.

According to the invention, there is further provided a method for manufacturing a cement board of explosive-split fragments obtained by introducing explosive-split fragments obtained from wooden materials through predetermined steps into a frame, then supplying mortar onto the from wooden materials, next vibrating the frame to remove voids in the mixture of the explosive-split fragments and mortar, compressing and fixing the mixture, releasing the pressure after hardening the mortar, and curing a mass of explosive-split fragments hardened and shaped into a predetermined configuration by mortar, the predetermined steps comprising:

(a) adjusting water content of wooden source materials including wood and bamboo;
(b) compressing the source materials under a high temperature; and
(c) after compressing the source materials for a predetermined duration of time, instantaneously releasing the pressure to invite water vapor explosion in the wooden materials and partly or entirely releasing fiber coupling in the wooden materials along fibers thereof, to thereby realize new and useful wooden materials utilizing wooden materials to overcome the problems involved in the conventional techniques.

According to the invention, there is further provided a technique including predetermined steps to thereby realize new and useful wooden materials to overcome the problems involved in the conventional techniques, the predetermined steps comprising:

(a) adjusting water content of wooden source materials including wood and bamboo;
(b) compressing the source materials under a high temperature;
(c) after compressing the source materials for a predetermined duration of time, instantaneously releasing the pressure to invite water vapor explosion in the wooden materials and partly or entirely releasing fiber coupling in the wooden materials along fibers thereof;
(d) drying the explosive-split fragments;
(e) supplying an expandable resin onto the dried explosive-split fragments;
(f) stacking the explosive-split fragments obtained in the step (e); and
(g) compressing the stacked explosive-split fragments obtained in the step (f) before the resin starts to expand so that the expandable resin be permitted to expand and cure under the pressure.

According to the invention, in order to facilitate industrial fabrication of the new materials, there is provided a manufacturing machine comprising:

storage means for storing wooden source materials including wood and bamboo, which are cut into a predetermined shape;
transport means for drawing out the wooden source materials from the storage means and aligning them in a single layer so that fibers in respective wooden source materials be in parallel;
stacking means for stacking the wooden source materials transported in a single layer from the transport means into a plurality of layers with a predetermined width and thickness; and
compressing the wooden source materials in stacked layers under a high temperature and instantaneously releasing the pressure to cause water vapor explosion in the wooden source materials.

According to the invention, there is further provided a machine for manufacturing a multi-layered board of explosive-split fragments comprising:

storage means for storing wooden source materials including wood and bamboo, which are cut into a predetermined shape;
transport means for drawing out said wooden source materials from said storage means and aligning them in a single layer so that fibers in respective said wooden source materials be in parallel;
first stacking means for stacking said wooden source materials transported in a single layer from said transport means into a plurality of layers with a predetermined width and thickness;
explosively splitting means for compressing said wooden source materials in stacked layers under a high temperature and instantaneously releasing the pressure to cause water vapor explosion in said wooden source materials;
drying means for drying said explosive-split fragments obtained by said explosively splitting means;
second stacking means for applying an adhesive onto the dried explosive-split fragments sent from said drying means and stacking said explosive-split fragments into a predetermined configuration; and
heat/pressing means for compressing the stacked explosive-split fragments sent from said second stacking means under a heat.

According to the invention, there is further provided a machine for manufacturing a cement board of explosive-split fragments, comprising:

storage means for storing wooden source materials including wood and bamboo, which are cut into a predetermined shape;
first transport means for drawing out the wooden source materials from the storage means and aligning them in a single layer so that fibers in respective said wooden source materials be in parallel;
first stacking means for stacking the wooden source materials transported in a single layer from said first transport means into a plurality of layers with a predetermined width and thickness;
explosively splitting means for compressing the wooden source materials in stacked layers under a high temperature and instantaneously releasing the pressure to cause water vapor explosion in the wooden source materials;
second transport means for cutting the explosive-split fragments obtained by the explosively splitting means into a predetermined length and delivering them to the next step;
second stacking means for stacking the explosive-split fragments in the frame in several layers in response to forward and backward movements of the frame;

supplying mortar in response to forward and backward movements of the frame every time when a single layer of explosive-split fragments is formed in the frame by the second stacking means;

vibrating means for vibrating the frame containing stacked explosive-split fragments and mortar supplied thereto to remove voids inside; and applying pressure onto explosive-split fragments and mortar in said frame.

According to the invention, there is further provided a machine for manufacturing a foamed resin board of explosive-split fragments, comprising:

storage means for storing wooden source materials including wood and bamboo, which are cut into a predetermined shape;

transport means for drawing out the wooden source materials from the storage means and aligning them in a single layer so that fibers in respective the wooden source materials be in parallel;

first stacking means for stacking the wooden source materials transported in a single layer from said transport means into a plurality of layers with a predetermined width and thickness;

explosively splitting means for compressing the wooden source materials in stacked layers under a high temperature and instantaneously releasing the pressure to cause water vapor explosion in the wooden source materials;

drying means for drying explosive-split fragments obtained by the explosively splitting means;

second stacking means for spraying an expandable resin onto the explosive-split fragments sent from the drying means and for stacking the explosive-split fragments into a predetermined configuration; and compressing means for compressing the stacked explosive-split fragments sent from the second stacking means before the resin starts to expand so that the expandable resin be permitted to expand and cure under the pressure.

BRIEF DESCRIPTION OF THE DRAWINGS

FIG. 6 is a table showing properties of explosively-split fragments according to an embodiment of the invention; and FIG. 7 is a table showing properties of explosively-split fragments according to another embodiment of the invention.

DETAILED DESCRIPTION OF THE PREFERRED EMBODIMENTS

Figure 1:
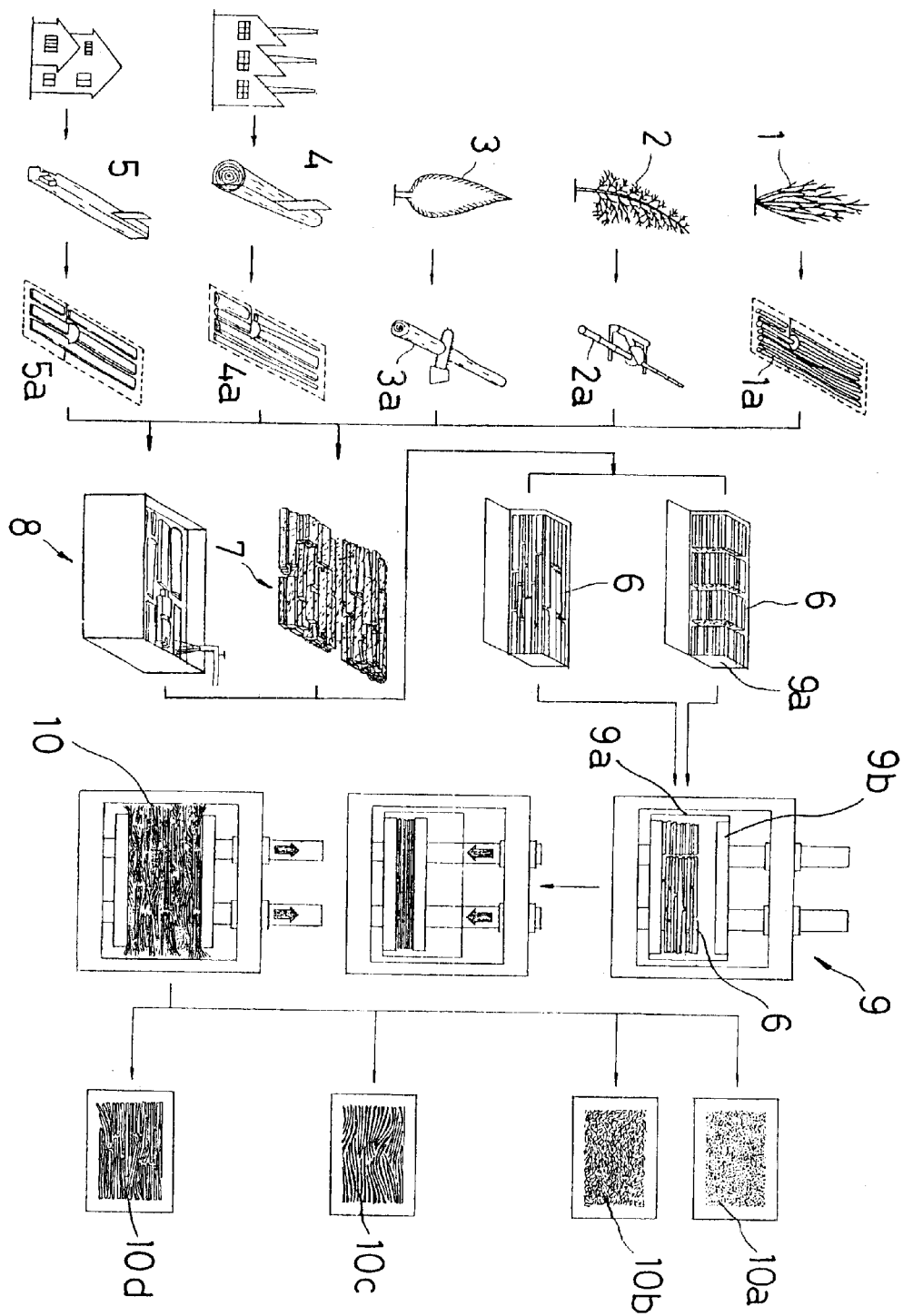
FIG. 1 is a flow chart showing a process for manufacturing explosively-split fragments.

Explosively-split fragments and a method for manufacturing them from wooden source materials according to an embodiment are explained below with reference to the drawings. FIG. 1 shows a process for manufacturing such explosively-split fragments.

In the embodiment shown here, raw materials, such as willow 1, bamboo 2 and cedar 3, and remainder pieces 5 from lumber factories, and wastes 5 from destructed houses, among others, are used as original materials. Although this embodiment is shown as making explosively-split fragments from each original material illustrated, any other kind of tree and any other residues or wastes may be used, and these different kinds of original materials may be mixed appropriately. The raw materials used here are slim trees and branches as thin as approximately 2 to 10 cm in diameter. As a primary treatment, metal pieces, earth, sand, and so forth, are removed especially from wastes. Thereafter, these original materials are cut by a rotary saw into sections 6 as long as approximately 60 cm, such as willow sections 1a, bamboo sections 2a, cedar sections 3a, remainder-piece sections 4a, waste sections 5a, for example. Also used are source materials shorter than 60 cm.

After the primary treatment, the amount of water content of the sections 6 is controlled to not lower than approximately 20%. For this adjustment, sprinkler means 7 or immersing means 8 is used as illustrated.

After that, the sections 6 adjusted in moisture content are set in an explosive-splitting machine 9. The explosive-splitting machine 9 includes a housing 9a open to the top and a hot press 9b vertically movable inside the housing 9a. The sections 6 are accumulated in parallel alignment with the lengthwise direction within the housing 9a, and the housing 9a containing these sections 6 is set in an explosive splitter 9. Then, after heat and pressure are applied to the sections 6 by the hot press 9b, the pressure is released for a moment. As a result, water vapor explosion occurs inside the accumulated sections 6, and all of the sections 6 are explosively split. Thus, explosively split fragments 10 are obtained in the housing 9a.

Conditions for applying heat and pressure by the hot press 9b are determined appropriately. When the temperature is 200 through $300^E$ C., the pressure is 5 to 15 MPa, and the time for applying heat and pressure is 20 through 200 seconds, explosive-split fragments partly or entirely released in fiber coupling along their fibers into various configurations can be obtained as shown at 10a through 10d in FIG. 1. In FIG. 1, 10a denotes powdered explosive-split fragments, 10b denotes cottony ones, 10c denotes string-shaped ones, and 10d denotes fine rod-shaped ones.

In this manner, wooden raw materials can be divided and split along their fibers without using any cutter, and the products are usable in various modes of use, in addition to the use as new materials like multi-layered materials, explosive-split cement boards, and explosive-split foamed resin boards. That is, wooden material fragments with desired configurations and properties can be obtained efficiently, and the production cost therefor is low.

Figure 2:
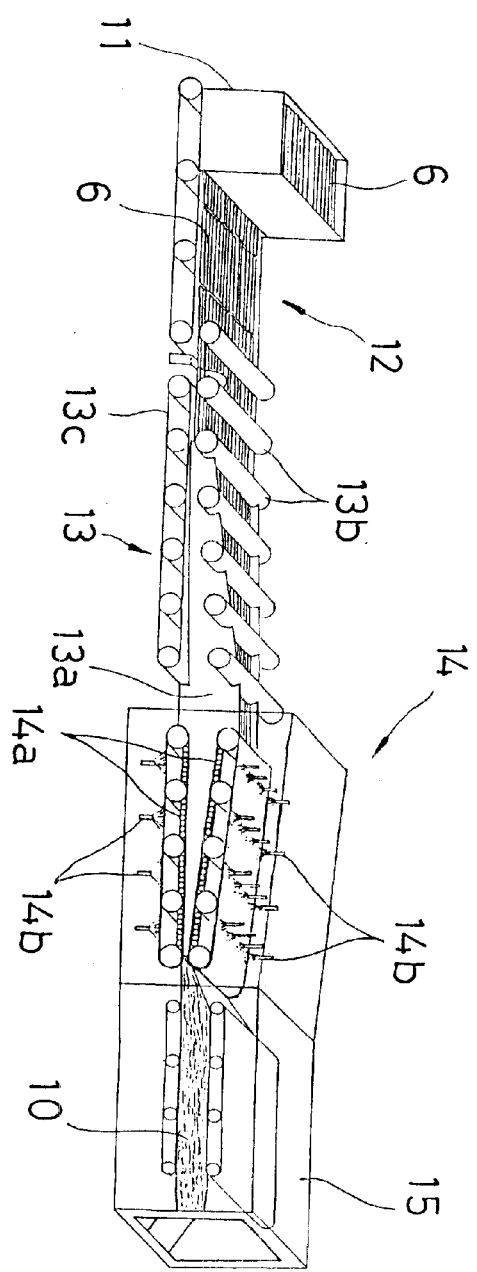
FIG. 2 is a diagram showing a machine for manufacturing explosively-split fragments according to an embodiment of the invention.

FIG. 2 is a diagram illustrating a manufacturing machine of these explosive-split fragments, which embodies the invention.

In FIG. 2, reference numeral 11 denotes a storage means of sections 6 such as willow sections 1a, bamboo sections 2a, cider sections 3a, cutting sections 4a, waste sections 5a, and so on, which are shown in FIG. 1. Numeral 12 denotes a belt conveyor as transport means for drawing out sections 6 from the storage means 11, aligning them in a single layer with their fiber orientation in parallel, and transporting them to the next step. Numeral 13 denotes a stacking means for stacking several layers of sections 6 consecutively delivered from the transport means 12 while adjusting the width of each layer of sections 6. The stacking means 13 includes a belt conveyor 13c, a pair of converging plates 13a for gradually converging the width of sections 6 spread in a single layer by urging from the opposite sides while the sections move along, and press rollers 13b interposed between the pair of converging plates 13a. The converging plates 13a are slanted such that their height gradually increases from the start end to the final end, and the start end nearer to the transport means 12, i.e. the inlet end, has the same width as that of the belt conveyor 13c. The final end, i.e., the outlet end, is decreased in width to a predetermined width. Therefore, sections 6 are accumulated to some layers from the single layer while they run on the belt conveyor 13c, and when they exit from the stacking means 13, they exhibit an accumulated configuration adjusted in width and height to the dimension of the outlet end of the pair of converging plates 13a.

Numeral 14 denotes an explosively splitting apparatus for explosively splitting a mass of sections delivered from the stacking means 13 into fragments. The explosively splitting apparatus 14 includes a pair of upper and lower steel feeding belt 14a extending in a housing, and a heating means 14b for heating the steel feeding belts 14a. The paired upper and lower steel feeding belts 14a are largely vertically distant from each other at their inlet side, that is, their end connected to the stacking means 13. This distance is equal to the height of the outlet end of the converging plates 13a. The distance between the paired upper and lower steel feeding belts 14a is getting narrower toward their final end, and at the final end, namely, the outlet end, the distance between the upper and lower steel feeding belts is much narrower than that of the inlet end.

Therefore, the mass of sections 6 delivered from the stacking means 13 is gradually compressed while running between the upper and lower steel feeding belts 14a, and simultaneously heated (200 to 300° C.) by the heating means 14b via the steel feeding belts 14a. The pressure to the mass of sections 6 is maximized at the outlet end which is the terminal end of the paired upper and lower steel feeding belts 14a. In this embodiment, it is set to 10 MPa.

The mass of sections 6 is suddenly released from pressure when passing the terminal end of the upper and lower steel feeding belts 14a, that is, the outlet end. As a result, due to water vapor explosion, the sections 6 are instantaneously released in fiber coupling along their fibers and broken into fragments. The explosive-split fragments 10 through these steps are sent to a container means 15. Operations of the manufacturing machine explained above are automatically controlled by a controller using a microcomputer, for example.

Explosive-split fragments of various configurations obtained without using any cutter will be usable in various modes from source materials of pulp to aggregate of construction materials. The Inventor, however, has developed new materials using these explosive-split fragments as a kind of aggregate. These new materials are expected to have not only the performance of existing wooden materials but also other various performances, and they will be useful as materials of furniture, houses and other buildings, boards for civil engineering constructions, stanchion materials, beam materials, and so on. Explanation is made below about these new materials.

Figure 3:
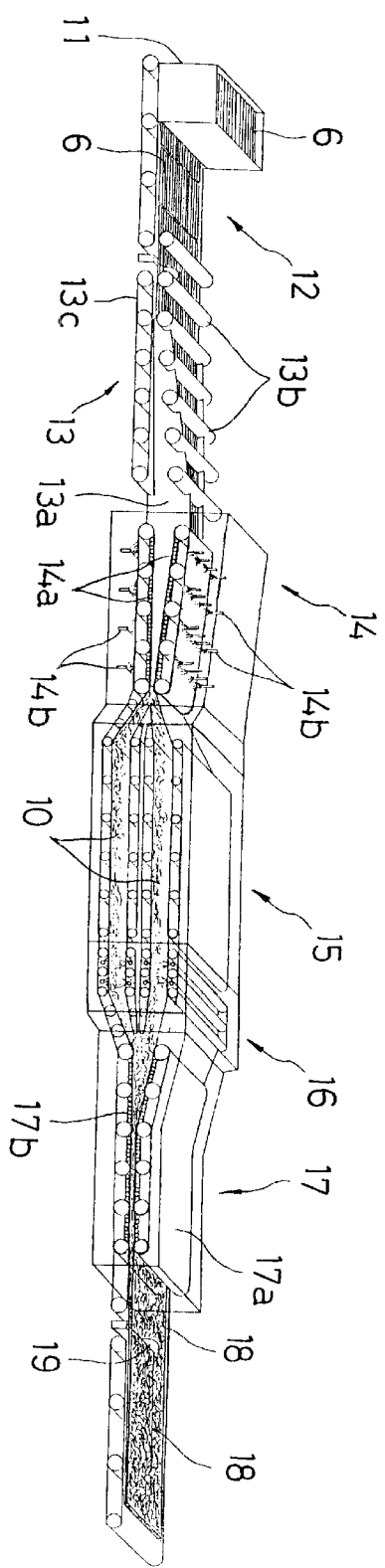
FIG. 3 is a diagram showing a machine for manufacturing a multi-layered material of explosively-split fragments according to an embodiment of the invention.

FIG. 3 is a diagram of a manufacturing machine of laminates of explosive-split fragments made by stacking explosive-split fragments according to the invention by a bonding agent. The machine, and laminates of explosive-split fragments and their manufacturing methods, are explained below.

In FIG. 3, reference numeral 11 denotes a storage means of sections 6 such as willow sections 1a, bamboo sections 2a, cider sections 3a, cutting sections 4a, waste sections 5a, and so on, which are shown in FIG. 1. Numeral 12 denotes a belt conveyor as transport means for drawing out sections 6 from the storage means 11, aligning them in a single layer with their fiber orientation in parallel, and transporting them to the next step. Numeral 13 denotes a stacking means for stacking several layers of sections 6 consecutively delivered from the transport means 12 while adjusting the width of each layer of sections 6. The stacking means 13 includes a belt conveyor 13c, a pair of converging plates 13a for gradually converging the width of sections 6 spread in a single layer by urging from the opposite sides while the sections move along, and press rollers 13b interposed between the pair of converging plates 13a. The converging plates 13a are slanted such that their height gradually increases from the start end to the final end, and the start end nearer to the transport means 12, i.e. the inlet end, has the same width as that of the belt conveyor 13c. The final end, i.e., the outlet end, is decreased in width to a predetermined width. Therefore, sections 6 are accumulated in some layers from the single layer while they run on the belt conveyor 13c, and when they exit from the stacking means 13, they exhibit an accumulated configuration adjusted in width and height to the dimension of the outlet end of the pair of converging plates 13a.

Numeral 14 denotes an explosively splitting apparatus for explosively splitting a mass of sections delivered from the stacking means 13 into fragments. The explosively splitting apparatus 14 includes a pair of upper and lower steel feeding belt 14a extending in a housing, and a heating means 14b for heating the steel feeding belts 14a. The paired upper and lower steel feeding belts 14a are largely vertically distant from each other at their inlet side, that is, their end connected to the stacking means 13. This distance is equal to the height of the outlet end of the converging plates 13a. The distance between the paired upper and lower steel feeding belts 14a is getting narrower toward their final end, and at the final end, namely, the outlet end, the distance between the upper and lower steel feeding belts is much narrower than that of the inlet end.

Therefore, the mass of sections 6 delivered from the stacking means 13 is gradually compressed while running between the upper and lower steel feeding belts 14a, and simultaneously heated (200 to 300° C.) by the heating means 14b via the steel feeding belts 14a. The pressure to the mass of sections 6 is maximized at the outlet end which is the terminal end of the paired upper and lower steel feeding belts 14a. In this embodiment, it is set to 10 MPa.

The mass of sections 6 is suddenly released from pressure when passing the terminal end of the upper and lower steel feeding belts 14a, that is, the outlet end. As a result, due to water vapor explosion, the sections 6 are instantaneously released in fiber coupling along their fibers and broken into fragments, and explosive-split fragments 10 are obtained.

Numeral 15 denotes a drier means for drying explosive-split fragments 10 sent from the explosively splitting means 14. In the drier means 15, explosive-split fragments 10 are supported on nets transported by a roller, and dried by a high-temperature air blow while they move. In the illustrated example, two nets, upper and lower, are used. But only one net is acceptable depending upon the quantity of explosive-split fragments 10. Numeral 16 denotes a second stacking means for spraying a thermally setting adhesive from nozzles onto explosive-split fragments 10 sent from the drier means 15 and for stacking these explosive-split fragments 10 in a predetermined configuration. The explosive-split fragments 10 sent in upper and lower two layers from the drier means 15 are joined together and sent to a heat-pressing means in the next stage after the thermally setting adhesive is sprayed from the nozzles onto the explosive-split fragments 10 in each layer under movement.

Numeral 17 denotes the heat-pressing means for compressing accumulated explosive-split fragments 10 sent from the second stacking means 16 under a heat. The heat-pressing means 17 includes an upper steel feeding belt 17a and a lower steel feeding belt 17b both extending within a housing, and a heating means for heating the upper and lower steel feeding belts. The upper steel feeding belt 17a includes a slanted portion and a flat portion whereas the lower steel feeding belt 17b is entirely flat. The slanted portion of the upper steel feeding belt 17a gradually slopes down from its start end and merges with the flat portion. The flat portion of the upper steel feeding belt 17a and the lower steel feeding belt 17b are distant by a predetermined distance. Therefore, accumulated explosive-split fragments 10 sent from the second stacking means 16 are progressively compressed while moving between the upper steel feeding belt 17a and the lower steel feeding belt 17b. When they reach between the flat portion of the upper steel feeding belt 17a and the lower steel feeding belt 17b, a predetermined pressure is applied thereto under a heat, the adhesive thermally sets, and a multi-layered material 18 made of explosive-split fragments is obtained.

In the embodiment shown here, the pressure is set within the range from 1 to 4 MPa, and the heating temperature within the range from 100 to 150° C. The pressure can be adjusted by adjusting the distance between the flat portion of the upper belt 17a and the lower belt 17b.

The multi-layered material 18 of explosive-split fragments is then discharged from the heat-pressing means 17 and cut into a predetermined length by a cross cut saw 19.

The multi-layered material of explosive-split fragments obtained through these steps is made by using as its aggregate a mass of explosive-split fragments obtained by splitting wooden materials along their fiber orientations by explosive splitting, and hardening them with an adhesive. Therefore, it has a strength larger than that of lumbers. Explosive-split fragments made by splitting wooden materials along their fiber orientations are closely bound together by the adhesive, and the fiber structures of the source materials are maintained. Therefore, the multi-layered material of these explosive-split fragments is remarkably strong.

Additionally, since splitting of wooden materials along their fiber orientations, that is, decomposition of fiber coupling along fiber extending directions, is executed by water vapor explosion without using any cutter, the manufacturing efficiency is high, and the manufacturing cost is low.

Operations of the manufacturing machine explained above are automatically controlled by a controller including a microcomputer, for example.

Although the above-explained embodiment is configured to consecutively manufacture multi-layered materials 18 of explosive-split fragments in form of flat plates, the shape of the cement board 27 of explosive-split fragments is not limited to flat plates.

That is, as explained with reference to FIG. 1, explosive-split fragments of various shapes and properties, such as powdered (10a), cottony (10B), string-shaped (10c) and rod-shaped (10d) ones, can be obtained by changing conditions including pressure, heating temperature and compression time, etc., in the explosively splitting means 14, and responsively, multi-layered materials of explosive-split fragments of various shapes and properties can be obtained as well. For example, by using powdered (10a), cottony (10b) and string-shaped (10c) explosive-split fragments as source materials and using molding boxes of various configurations, multi-layered materials with any shapes, such as curved faces, can be manufactured.

In the embodiment shown here, explosive-split fragments 10 are manufactured continuously, and multi-layered materials 18 of explosive-split fragments are also manufactured continuously. However, it is also possible to obtain explosive-split fragments 10 by using the explosively splitting apparatus 9 shown in FIG. 1 and to supply them consecutively to the drier means 15 shown in FIG. 3.

Figure 4:
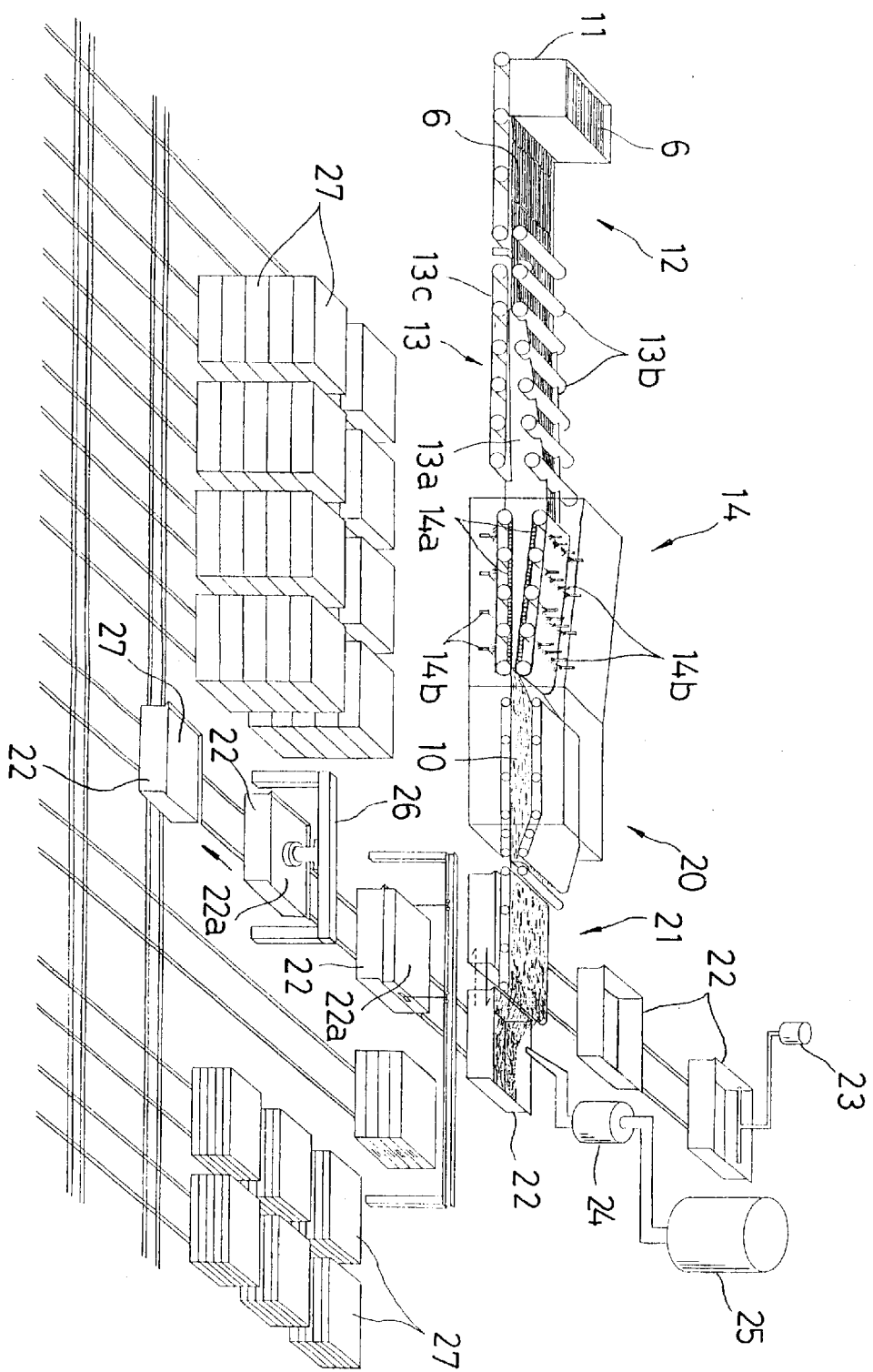
FIG. 4 is a diagram showing a machine for manufacturing an explosively-split fragment cement board according to an embodiment of the invention.

FIG. 4 is a diagram showing a manufacturing machine for manufacturing cement boards of explosive-split fragments using explosive-split fragments according to the invention as their aggregate. The machine, and cement boards of explosive-split fragments and their manufacturing methods, are explained below.

In FIG. 4, reference numeral 11 denotes a storage means of sections 6 such as willow sections 1a, bamboo sections 2a, cider sections 3a, cutting sections 4a, waste sections 5a, and so on, which are shown in FIG. 1. Numeral 12 denotes a belt conveyor as transport means for drawing out sections 6 from the storage means 11, aligning them in a single layer with their fiber orientation in parallel, and transporting them to the next step. Numeral 13 denotes a stacking means for stacking several layers of sections 6 consecutively delivered from the transport means 12 while adjusting the width of each layer of sections 6. The stacking means 13 includes a belt conveyor 13c, a pair of converging plates 13a for gradually converging the width of sections 6 spread in a single layer by urging from the opposite sides while the sections move along, and press rollers 13b interposed between the pair of converging plates 13a. The converging plates 13a are slanted such that their height gradually increases from the start end to the final end, and the start end nearer to the transport means 12, i.e. the inlet end, has the same width as that of the belt conveyor 13c. The final end, i.e., the outlet end, is decreased in width to a predetermined width. Therefore, sections 6 are accumulated in some layers from the single layer while they run on the belt conveyor 13c, and when they exit from the stacking means 13, they exhibit an accumulated configuration adjusted in width and height to the dimension of the outlet end of the pair of converging plates 13a.

Numeral 14 denotes an explosively splitting means for explosively splitting a mass of sections delivered from the first stacking means 13 into fragments. The explosively splitting means 14 includes a pair of upper and lower steel feeding belt 14a extending in a housing, and a heating means 14b for heating the steel feeding belts 14a. The paired upper and lower steel feeding belts 14a are largely vertically distant from each other at their inlet side, that is, their end connected to the first stacking means 13. This distance is equal to the height of the outlet end of the converging plates 13a. The distance between the paired upper and lower steel feeding belts 14a is getting narrower toward their final end, and at the final end, namely, the outlet end, the distance between the upper and lower steel feeding belts is much narrower than that of the inlet end.

Therefore, the mass of sections 6 delivered from the first stacking means 13 is gradually compressed while running between the upper and lower steel feeding belts 14a, and simultaneously heated (200 to 300° C.) by the heating means 14b via the steel feeding belts 14a. The pressure to the mass of sections 6 is maximized at the outlet end which is the terminal end of the paired upper and lower steel feeding belts 14a. In this embodiment, it is set to 10 MPa. Pressure in the explosively splitting means 14 is adjusted by adjusting the distance between the upper and lower paired steel feeding belts 14a at their terminal end.

The mass of sections 6 is suddenly released from pressure when passing the terminal end of the upper and lower steel feeding belts 14a, that is, the outlet end. As a result, due to water vapor explosion, the sections 6 are instantaneously released in fiber coupling along their fibers and broken into fragments, and explosive-split fragments 10 are obtained.

Numeral 20 denotes a second transport means for drying explosive-split fragments 10 obtained in the explosively splitting means 14, cutting them to a predetermined length with a cross cut saw, for example, and sending them to the next step. Numeral 21 denotes a second stacking means for stacking explosive-split fragments 10 sent from the second transport means 20 in several layers within a steel frame 22. The frame 22 is movable relative to the second stacking means 21. In response to a movement of the second stacking means 21, explosive-split fragments 10 are spread in the frame 22 up to a uniform thickness to form a single layer of fragments. Responsively, mortar is sprayed onto the single layer of fragments from a mortar injection means 24. Repeating these steps, some layers of explosive-split fragments 10, each applied with mortar, are stacked in the frame 22. In the frame 22, a cement separating agent is previously applied inside the frame 22. Reference numeral 25 denotes a mixer for preparing mortar by mixing cement, sand, water, curing agent, and so forth, by a predetermined ratio, and supplying it to the mortar injection means 24.

When the steel frame 22 is filled with explosive-split fragments 10 and mortar, an upper lid 26 is put on the steel frame 22, and the steel frame in this status is sent to a vibrating/compressing means 26. In the vibrating/compressing means 26, after removing void in the mixture of explosive-split fragments and mortar by vibrating the entirety of the steel frame 22, the upper lid 22a is urged and fixed to maintain a predetermined compressing pressure on and between the explosive-split fragments 10 and mortar.

After the mortar cures, the pressure is released, and the steel frame 22 is moved to a curing chamber.

After one or two days of curing, the steel frame 22 is decomposed to obtain a cement board 27 of explosive-split fragments 27 in which explosive-split fragments 10 are firmly bound by the cured mortar. The cement board 27 of explosive-split fragments completed in this manner may be continuously held under curing where necessary.

The cement board of explosive-split fragments obtained through these steps is made by using as its aggregate a mass of explosive-split fragments obtained by splitting wooden materials along their fiber orientations by explosive splitting, and enclosing them with mortar. Therefore, it is usable as a material having a fire resistivity and a strength close to that of lumbers. larger than that of lumbers. Explosive-split fragments made by splitting wooden materials along their fiber orientations closely bond to mortar, and the fiber structures of the source materials are maintained. Therefore, the cement board of these explosive-split fragments is remarkably strong.

Additionally, since splitting of wooden materials along their fiber orientations is executed by water vapor explosion without using any cutter, the manufacturing efficiency is high, and the manufacturing cost is low.

Operations of the manufacturing machine explained above are automatically controlled by a controller including a microcomputer, for example.

Although the above-explained embodiment is configured to consecutively manufacture cement boards 27 of explosive-split fragments in form of flat plates, the shape of the multi-layered material 18 of explosive-split fragments is not limited to flat plates.

That is, as explained with reference to FIG. 1, explosive-split fragments of various shapes and properties, such as powdered (10a), cottony (10B), string-shaped (10c) and rod-shaped (10d) ones, can be obtained by changing conditions including pressure, heating temperature and compression time, etc., in the explosively splitting means 14, and responsively, cement boards of explosive-split fragments of various shapes and properties can be obtained as well. For example, by using powdered (10a), cottony (10b) and string-shaped (10c) explosive-split fragments as source materials and using molding boxes of various configurations, multi-layered materials with any shapes, such as curved faces, can be manufactured.

In the embodiment shown here, explosive-split fragments 10 are manufactured continuously, and cement boards 27 of explosive-split fragments are also manufactured continuously. However, it is also possible to obtain explosive-split fragments 10 by using the explosively splitting apparatus 9 shown in FIG. 1 and to continuously supply them to the second transport means 20 shown in FIG. 4.

Figure 5:
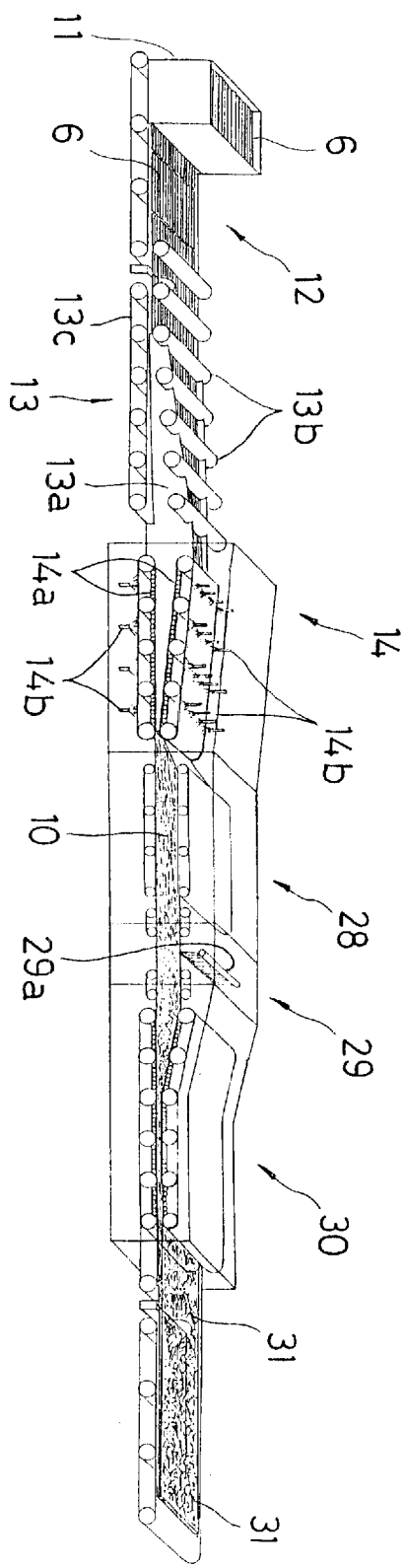
FIG. 5 is a diagram showing a machine for manufacturing a foamed resin board of explosively-split fragments according to an embodiment of the invention.

FIG. 5 is a diagram showing a manufacturing machine for manufacturing a foamed resin board of explosive-split fragments using explosive-split fragments according to the invention as its aggregate. The machine, and foamed resin boards of explosive-split fragments and their manufacturing methods, are explained below.

In FIG. 5, reference numeral 11 denotes a storage means of sections 6 such as willow sections 1a, bamboo sections 2a, cider sections 3a, cutting sections 4a, waste sections 5a, and so on, which are shown in FIG. 1. Numeral 12 denotes a belt conveyor as transport means for drawing out sections 6 from the storage means 11, aligning them in a single layer with their fiber orientation in parallel, and transporting them to the next step. Numeral 13 denotes a first stacking means for stacking several layers of sections 6 consecutively delivered from the transport means 12 while adjusting the width of each layer of sections 6. The first stacking means 13 includes a belt conveyor 13c, a pair of converging plates 13a for gradually converging the width of sections 6 spread in a single layer by urging from the opposite sides while the sections move along, and press rollers 13b interposed between the pair of converging plates 13a. The converging plates 13a are slanted such that their height gradually increases from the start end to the final end, and the start end nearer to the transport means 12, i.e. the inlet end, has the same width as that of the belt conveyor 13c. The final end, i.e., the outlet end, is decreased in width to a predetermined width. Therefore, sections 6 are accumulated in some layers from the single layer while they run on the belt conveyor 13c, and when they exit from the stacking means 13, they exhibit an accumulated configuration adjusted in width and height to the dimension of the outlet end of the pair of converging plates 13a.

Numeral 14 denotes an explosively splitting means for explosively splitting a mass of sections delivered from the first stacking means 13 into fragments. The explosively splitting means 14 includes a pair of upper and lower steel feeding belt 14a extending in a housing, and a heating means 14b for heating the steel feeding belts 14a. The paired upper and lower steel feeding belts 14a are largely vertically distant from each other at their inlet side, that is, their end connected to the first stacking means 13. This distance is equal to the height of the outlet end of the converging plates 13a. The distance between the paired upper and lower steel feeding belts 14a is getting narrower toward their final end, and at the final end, namely, the outlet end, the distance between the upper and lower steel feeding belts is much narrower than that of the inlet end.

Therefore, the mass of sections 6 delivered from the first stacking means 13 is gradually compressed while running between the upper and lower steel feeding belts 14a, and simultaneously heated (200 to 300° C.) by the heating means 14b via the steel feeding belts 14a. The pressure to the mass of sections 6 is maximized at the outlet end which is the terminal end of the paired upper and lower steel feeding belts 14a. In this embodiment, it is set to 10 MPa. Pressure in the explosively splitting means 14 is adjusted by adjusting the distance between the upper and lower paired steel feeding belts 14a at their terminal end.

The mass of sections 6 is suddenly released from pressure when passing the terminal end of the upper and lower steel feeding belts 14a, that is, the outlet end. As a result, due to water vapor explosion, the sections 6 are instantaneously released in fiber coupling along their fibers and broken into fragments, and explosive-split fragments 10 are obtained.

Numeral 28 denotes a drier means for drying explosive-split fragments 10 sent from the explosively splitting means 14 by using a hot air blow. Numeral 29 denotes a second stacking means for spraying expandable resin onto dried explosive-split fragments 10 through a nozzle 29a and delivering them of a predetermined thickness to the next stage.

Explosive-split fragments 10 supplied with expandable resin and accumulated to a predetermined thickness are sent to a press means 30 in the next stage before expansion of the resin.

The press means 30 includes an upper steel feeding belt 30a and a lower steel feeding belt 30b both extending within a housing. The upper steel feeding belt 30a includes a slanted portion and a flat portion whereas the lower steel feeding belt 30b is entirely flat. The slanted portion of the upper steel feeding belt 30a gradually slopes down from its start end and merges with the flat portion. The flat portion of the upper steel feeding belt 30a and the lower steel feeding belt 30b are distant by a predetermined distance. Therefore, accumulated explosive-split fragments 10 sent from the second stacking means 29 are progressively compressed while moving between the upper steel feeding belt 30a and the lower steel feeding belt 30b. When they reach between the flat portion of the upper steel feeding belt 30a and the lower steel feeding belt 30b, a predetermined pressure is applied thereto, the expandable resin expands and cures, and a foamed board 31 of explosive-split fragments is obtained. The foamed resin board 31 of explosive-split fragments is cut into a predetermined length by a cross cut saw, for example, when it is discharged from the press means 30. In the embodiment shown here, pressure of the press means 30 is set in the range from 0 to 0.2 MPa, and it is adjusted by adjusting the distance between the flat portion of the upper steel feeding belt 30a and the lower steel feeding belt 30b. Heat need not be applied during compression.

The foamed resin board of explosive-split fragments obtained through these steps is useful as a new heat-resistant material with a the greatest strength ever experienced. Additionally, since explosive-split fragments serving as aggregate can be made with any of various shapes and properties, such as powdered (10a), cottony (10B), string-shaped (10c) and rod-shaped (10d) ones as explained with reference to FIG. 1, heat-resistant materials with various properties, heavy or light, hard or soft, strong or weak, for example, can be obtained depending upon their applications.

Operations in the manufacturing machine are automatically controlled by a controller equipped with a microcomputer, for example.

In the embodiment shown here, foamed resin boards 31 of explosive-split fragments in form of flat plates are manufactured continuously. However, configuration of the foamed resin board 31 of explosive-split fragments is not limited to flat plates.

That is, as explained with reference to FIG. 1, explosive-split fragments of various shapes and properties, such as powdered (10a), cottony (10B), string-shaped (10c) and rod-shaped (10d) ones, can be obtained by changing conditions including pressure, heating temperature and compression time, etc., in the explosively splitting means 14, and so, foamed resin boards of explosive-split fragments of various shapes and properties can be obtained as well. For example, by using powdered (10a), cottony (10b) and string-shaped (10c) explosive-split fragments as source materials and using molding boxes of various configurations, foamed resin boards with any shapes, such as curved faces, can be manufactured.

In the embodiment shown here, explosive-split fragments 10 are manufactured continuously, and foamed resin boards 31 of explosive-split fragments are also manufactured continuously. However, it is also possible to obtain explosive-split fragments 10 by using the explosively splitting apparatus 9 shown in FIG. 1 and to supply them consecutively to the drier means 28 shown in FIG. 5.

Next explained are explosive-split fragments embodying the invention.

EXAMPLE 1

In this example, sample materials were explosively split by using an existing hot press as the explosively splitting apparatus. Therefore, samples have no constraint in right angles relative to the load direction, and they are permitted to freely expand and contract in right angles under a load. The samples were of cedar which was largest in storage quantity in Japan, and water-saturated (100 to 200%) lumbers, 60 cm long, 10 cm wide and 2 cm thick, were introduced into a hot press. Then, by applying the pressure of 2, 3, 4, 6 MPa under the heating temperature of 200, 250 and 300° C., and by instantaneously releasing the pressure after maintaining constant pressures for predetermined durations of time to invite water vapor explosion, explosive-split fragments of various shapes were obtained. Its result is shown in FIG. 6.

The table of FIG. 6 shows durations of time required for explosive splitting when heating and compressing water-saturated 20 mm thick lumbers under the temperatures 200, 250 and 300° C. and compressing pressures 2, 4 and 6 MPa, and characters of strands (explosive-split fragments) obtained thereby. As the heating temperature and the compression pressure increase, the required time decreases, string-shaped strands (explosive-split fragments) are getting thinner and shorter, and coupling among strands (explosive-split fragments) changes from a cord-fabric configuration, net-shaped configuration to a semi-separated configuration.

Under the most severe heating and pressing conditions of 300° C. and 6 MPa, strands in form of minute cords, approximately 2 mm thick and 30 mm long, were obtained in a duration of time as short as 50 seconds, and strands were slightly coupled like a thread.

EXAMPLE 2

Samples used in this example were water-saturated (100 to 200%) lumbers, 60 cm long, 10 cm wide and 2 cm thick. In the other respects, Example 2 was the same as Example 1, and explosive-split fragments of various shapes were obtained. Its result is shown in FIG. 7.

The table of FIG. 7 shows durations of time required for explosive splitting when heating and compressing water-saturated 30 mm thick lumbers under the temperatures 200 and 2500° C. and compressing pressures 3 and 6 MPa, and characters of strands (explosive-split fragments) obtained thereby. As the heating temperature and the compression pressure increase, the required time decreases, string-shaped strands (explosive-split fragments) are getting thinner and shorter from plate-shaped ones, through rod-shaped and cord-shaped ones to the form of chips, and coupling among strands (explosive-split fragments) changes from a cord-fabric configuration, net-shaped configuration to a semi-separated configuration and a fully separated configuration. Under the most severe heating and pressing conditions of 250° C. and 6 MPa, strands in form of minute cords, approximately 3 mm thick and 200 mm long, were obtained in a duration of time as short as 90 seconds, and strands were coupled in form of a net.

Additionally, when lumbers were restricted in their width direction under the same heating and pressing conditions and thereafter released from the restriction simultaneously with release of the pressure, the required time was further decreased to 60 seconds, strands (explosive-split fragments) were thin and as short as 100 mm, and they were slightly couples in form of a thread.

As explained above, it has been confirmed that various strands (explosive-split fragments) can be fabricated by explosively splitting lumbers by the process of heating, compressing and instantaneously releasing in a very short time. Source materials used in the experiment were relatively thin lumbers of a uniform shape. However, materials to be practically used contain those of various shapes and sizes, and an enormous quantity of them must be processed. Therefore, it is difficult to directly use the heating and compressing conditions used in the experiment also for actual fabrication. However, satisfactory explosive-splitting processing is expected by increasing the compressing pressure, elongating the heating and compressing time and adding restriction in right angles relative to the load applying direction.

As described above, since the invention enables the use of all materials including slim trees or low quality trees which have been left unused, cut-off branches which have been discarded, wood cuttings produced in the course of lumbering, and construction wastes without waste, and promises a remarkably high yield relative to the source materials, it greatly improves the rate of effective use of wood materials. Additionally, since explosively split fragments can be reconstructed as various veneer laminates or composite materials by using an adhesive, resin or cement, and new functions not found in existing wooden materials can be added, the use of reconstructed materials can be extended not only as plates, pillars, stanchions, etc. of furniture, houses and other buildings, but also as civil engineering materials and industrial materials.

What is claimed is:

1. A method for manufacturing explosive-split fragments from wooden source materials comprising the steps of:

(a) adjusting water content of said source materials, said source materials comprising at least one of wood and bamboo;

(b) stacking a plurality of said source materials to align fibers of said source materials substantially in parallel;

(c) conveying the source materials along a conveyor belt to a splitting means having converging pressure plates;

(d) compressing said source materials as said source materials are conveyed at a predetermined pressure under a predetermined temperature for a predetermined amount of time by applying pressure to said source materials in a first direction via said converging pressure plates;

(e) restricting the source materials in a second direction perpendicular to said first direction; and (f) instantaneously releasing the pressure as the source materials are conveyed out of the splitting means to invite water vapor explosion in said source materials resulting in partly or entirely releasing fiber coupling in said source materials along fibers thereof, thereby to obtain at least one of powdered explosive-split fragments, cottony explosive-split fragments, string-shaped explosive-split fragments, or rod-shaped explosive-split fragments.

2. The method for manufacturing explosive-split fragments from wooden source materials according to claim 2, wherein:

the stacked wooden source material is gradually compressed to said predetermined pressure while being simultaneously heated to said predetermined temperature.

3. The method for manufacturing explosive-split fragments from wooden source materials according to claim 1, further comprising:

restricting said source materials in a direction parallel to a width of said source materials prior to compressing said source materials; and simultaneously releasing the restriction and releasing the pressure to obtain said explosive-split fragments.

4. The method for manufacturing explosive-split fragments from wooden source material according to claim 1, further comprising:

varying at least one of the predetermined pressure, the predetermined amount of time, and the predetermined temperature to obtain a particular one of said powdered explosive-split fragments, cottony explosive-split fragments, string-shaped explosive-split fragments, or rod-shaped explosive-split fragments.

5. The method for manufacturing explosive-split fragments from wooden source materials according to claim 1, wherein:

said predetermined temperature is a temperature in the range between 100° C. and 150° C.

6. The method for manufacturing explosive-split fragments from wooden source materials according to claim 1, wherein:

said predetermined temperature is a temperature in the range between 200° C. and 300° C.

7. The method for manufacturing explosive-split fragments from wooden source materials according to claim 1, wherein:

said predetermined pressure is a pressure in the range between 1 MPa to 4 Mpa.

8. The method for manufacturing explosive-split fragments from wooden source materials according to claim 1, wherein:

said predetermined pressure is a pressure in the range between 5 MPa to 15 Mpa.

9. The method for manufacturing explosive-split fragments from wooden source materials according to claim 1, wherein:

said predetermined time period is a time period in the range between 20 seconds to 200 seconds.

10. The method for manufacturing explosive-split fragments from wooden source materials according to claim 1, wherein:

said predetermined time period is a time period in the range between 20 seconds to 360 seconds.

* * * * *